United States Patent
Reznikov et al.

(10) Patent No.: US 11,126,055 B2
(45) Date of Patent: Sep. 21, 2021

(54) SWITCHING OF LIQUID CRYSTAL DEVICE

(71) Applicant: Verily Life Sciences LLC, South San Francisco, CA (US)

(72) Inventors: Dmytro Reznikov, Santa Clara, CA (US); Shungneng Lee, Sunnyvale, CA (US); Joshua Haddock, Mountain View, CA (US)

(73) Assignee: Verily Life Sciences LLC, South San Francisco, CA (US)

(*) Notice: Subject to any disclaimer, the term of this patent is extended or adjusted under 35 U.S.C. 154(b) by 0 days.

(21) Appl. No.: 16/505,563

(22) Filed: Jul. 8, 2019

(65) Prior Publication Data

US 2020/0018999 A1    Jan. 16, 2020

Related U.S. Application Data

(60) Provisional application No. 62/696,231, filed on Jul. 10, 2018.

(51) Int. Cl.
  *G02F 1/137* (2006.01)
  *G02C 7/08* (2006.01)
  (Continued)

(52) U.S. Cl.
  CPC ............ *G02F 1/137* (2013.01); *G02C 7/083* (2013.01); *G02F 1/13306* (2013.01);
  (Continued)

(58) Field of Classification Search
  None
  See application file for complete search history.

(56) References Cited

U.S. PATENT DOCUMENTS 5,917,465 A * 6/1999 Mochizuki ........... G09G 3/3648
  345/94
8,711,077 B2   4/2014 Chen et al.
  (Continued)

FOREIGN PATENT DOCUMENTS

EP      3223066 A1    9/2017
JP   2003-195255 A *  7/2003
  (Continued)

OTHER PUBLICATIONS

Invitation to Pay Additional Fees and, Where Applicable, Protest Fee dated Aug. 28, 2019, for corresponding International application No. PCT/US2019/041050, 13 pages.
(Continued)

*Primary Examiner* — Ryan Crockett
(74) *Attorney, Agent, or Firm* — Christensen O'Connor Johnson Kindness PLLC

(57) ABSTRACT

An apparatus comprising a liquid crystal material and a controller are described herein. The liquid crystal material is disposed between a first electrode and a second electrode opposite the first electrode. Molecules of the liquid crystal material assume a first orientation during a first state of the liquid crystal material and a second orientation during a second state of the liquid crystal material. The first orientation is different from the second orientation. The controller is coupled to the first electrode and the second electrode to perform operations. The operations include applying a first periodic waveform to the first electrode and a second periodic waveform to the second electrode to generate a drive waveform applied across the liquid crystal material. The operations further include changing a duty cycle of the drive waveform over a first time period to transition the liquid crystal material between the first state and the second state.

21 Claims, 9 Drawing Sheets

(51) Int. Cl.
  *G02F 1/1347* (2006.01)
  *G02F 1/29* (2006.01)
  *G02F 1/133* (2006.01)
  *G09G 3/36* (2006.01)
  *G02C 7/04* (2006.01)

(52) U.S. Cl.
  CPC ............ *G02F 1/13476* (2013.01); *G02F 1/29* (2013.01); *G09G 3/3696* (2013.01); *G02C 7/04* (2013.01); *G02F 1/13775* (2021.01); *G02F 1/294* (2021.01)

(56) References Cited

U.S. PATENT DOCUMENTS

| | | | |
|---|---|---|---|
| 8,760,081 | B2 | 6/2014 | Hagen et al. |
| 9,036,102 | B2 | 5/2015 | Galstian et al. |
| 2002/0186192 | A1 | 12/2002 | Maruoka et al. |
| 2003/0210377 | A1 | 11/2003 | Blum et al. |
| 2007/0080370 | A1 | 4/2007 | Miyachi et al. |
| 2007/0159562 | A1 | 7/2007 | Haddock et al. |
| 2007/0216851 | A1 | 9/2007 | Matsumoto |
| 2008/0180630 | A1 | 7/2008 | Clarke et al. |
| 2009/0153208 | A1* | 6/2009 | Lynch ................. G02F 1/13306 327/175 |
| 2010/0060831 | A1* | 3/2010 | Futamura .......... G02F 1/133528 349/97 |
| 2011/0216257 | A1* | 9/2011 | Galstian ................... G02F 1/29 349/33 |
| 2012/0212696 | A1 | 8/2012 | Trajkovska et al. |
| 2013/0166025 | A1 | 6/2013 | Pugh |
| 2013/0258275 | A1 | 10/2013 | Toner et al. |
| 2015/0077663 | A1 | 3/2015 | Pugh |
| 2017/0131568 | A1 | 5/2017 | Haddock |
| 2018/0031947 | A1* | 2/2018 | Shibuya ............... H04N 5/2257 |
| 2018/0096662 | A1* | 4/2018 | Lee ....................... G09G 3/3614 |
| 2019/0353945 | A1* | 11/2019 | Takahashi ............... H02M 5/02 |

FOREIGN PATENT DOCUMENTS

| | | | |
|---|---|---|---|
| JP | 2005505789 | A1 | 2/2005 |
| JP | 2008090259 | A | 4/2008 |
| JP | 2009523263 | A1 | 6/2009 |
| JP | 6161128 | B2 | 7/2017 |
| WO | 9324848 | A1 | 12/1993 |
| WO | 9324858 | A1 | 12/1993 |
| WO | 2007146853 | A2 | 12/2007 |
| WO | 2014132781 | A1 | 9/2017 |

OTHER PUBLICATIONS

Hsieh C.-Y., and S.-H. Chen, "Crucial Effects of Polar Alignment Symmetry on the Dynamical Behaviors of Quasi-Homeotropic Liquid Crystal Cells," Japan Journal of Applied Physics 41(Pt. 1, No. 8):5264-5265, Aug. 2002.
Gwag, J.S., "Advanced Patterned Vertical Aligned Nematic Mode to Elevate Transmittance," Journal of the Optical Society of Korea 18(1):78-81, Feb. 2014.
Hanaoka, K., et al., "40.1: A New MVA-LCD by Polymer Sustained Alignment Technology," SID Symposium Digest 35(1):1200-1203, May 2004.
Takeda, A., et al., "41.1: A Super-High Image Quality Multi-Domain Vertical Alignment LCD by New Rubbing-Less Technology," SID Symposium Digest 29(1):1077-1080, May 1998.
Weng, L., et al., "Anchoring Energy Enhancement and Pretilt Angle Control of Liquid Crystal Alignment on Polymerized Surfaces," AIP Advances 5:097218-1-097218-9, 2015.
Wu, W.-Y., et al., "Controlling Pre-Tilt Angles of Liquid Crystal Using Mixed Polyimide Alignment Layer," Optics Express 16(21):17131-17137, Oct. 2008.
Kim et al., Polarization-insensitive liquid crystal Fresnel lens of dynamic focusing in an orthogonal binary configuration, May 17, 2006.
Wang et al., "Liquid crystal lens with stacked structure of liquid-crystal layers", Jun. 15, 2005.
International Search Report and Written Opinion dated Jan. 16, 2017, issued in corresponding International Application No. PCT/US2016/057134, filed Oct. 14, 2016, 13 pages.
Examination Report No. 1 issued for Australian Patent Application No. 2016351444, dated Aug. 15, 2018, 3 pages.
Examination Report No. 2 issued for Australian Patent Application No. 2016351444, dated Dec. 18, 2018, 3 pages.
Notice of Reasons for Rejection issued for Japanese Patent Application No. 2018-515271, dated Apr. 23, 2019, 20 pages.
International Search Report & Written Opinion dated Oct. 21, 2019 for corresponding International Patent Application No. PCT/US2019/041050, 18 pages.

* cited by examiner

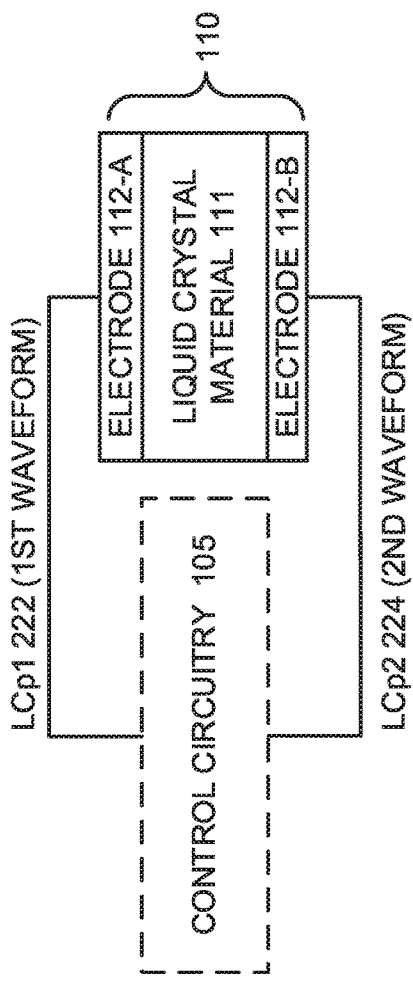
FIG. 2A
FIG. 2B
FIG. 2C

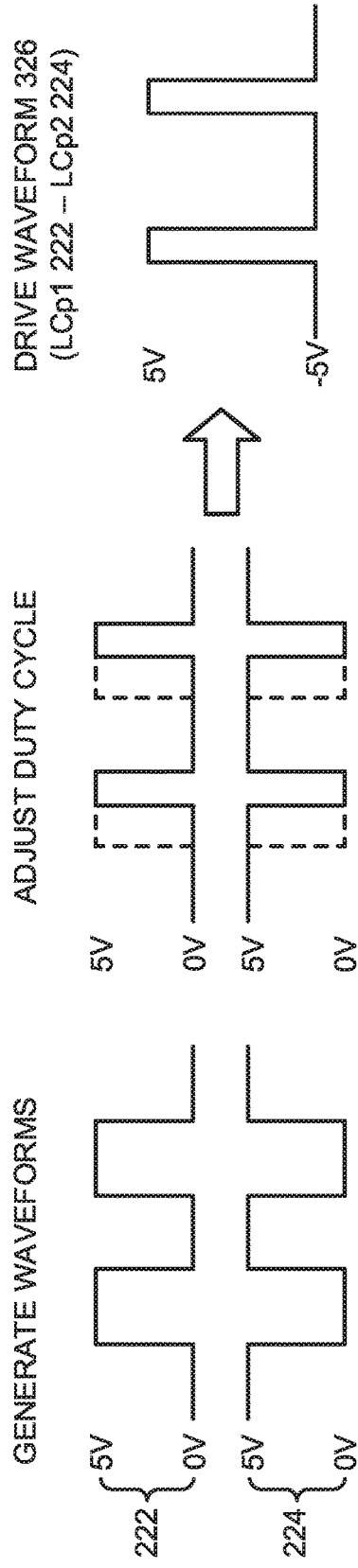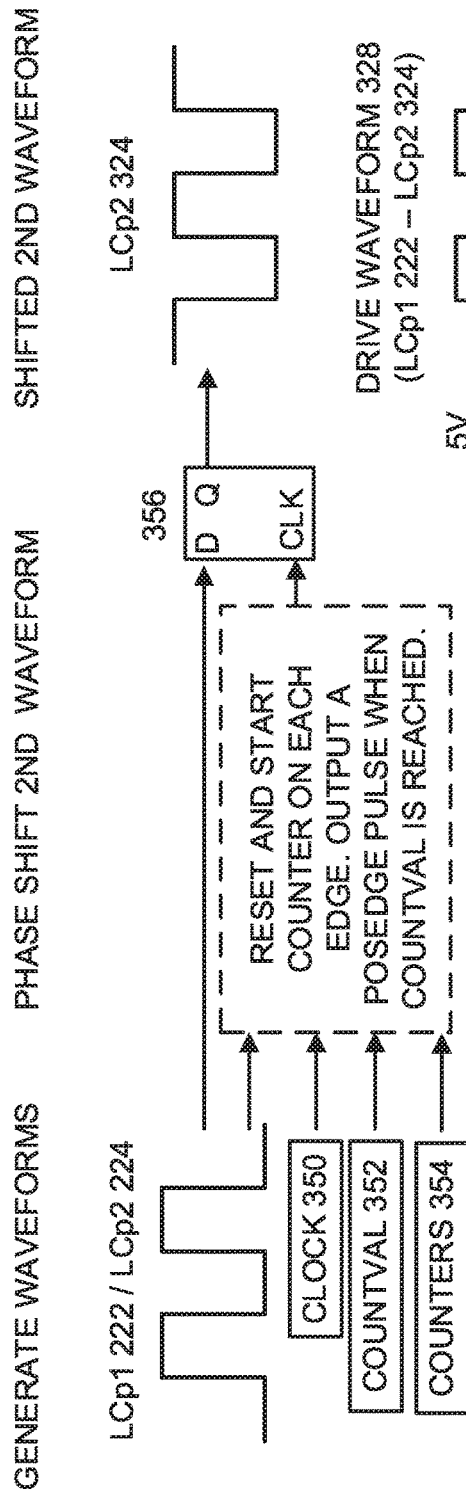
FIG. 3A
FIG. 3B

CONFIG A 692　　　　CONFIG B 694

SWITCHING OF LIQUID CRYSTAL DEVICE

CROSS-REFERENCE TO RELATED APPLICATIONS

This application claims the benefit of U.S. Provisional Application No. 62/696,231, filed Jul. 10, 2018, which is hereby incorporated by reference in its entirety.

TECHNICAL FIELD

This disclosure relates generally to the field of electro-optical devices, and in particular but not exclusively, relates to ophthalmic devices such as contact lenses and intraocular lenses.

BACKGROUND INFORMATION

Contact lenses are worn by a large number of people throughout the world, mainly for the purpose of vision correction. However, as lens technology continues to progress, the functionality of contact lenses may extend beyond merely providing static vision correction to other areas. For example, eye-mountable devices (EMD), smart contact lenses, or intraocular lenses, may offer unique opportunities in health monitoring, biometric sensing, dynamic vision correction, and other types of vision augmentation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 2A is a cross-sectional diagram of a liquid crystal device including a liquid crystal lens coupled to control circuitry, in accordance with an embodiment of the disclosure.

FIGS. 2B and 2C illustrate example periodic waveforms applied to electrodes of the liquid crystal lens and resultant drive waveform applied across the liquid crystal material.

FIGS. 3A-3B illustrate techniques for controlling a duty cycle of a drive waveform, in accordance with an embodiment of the disclosure.

DETAILED DESCRIPTION

Figure 1:
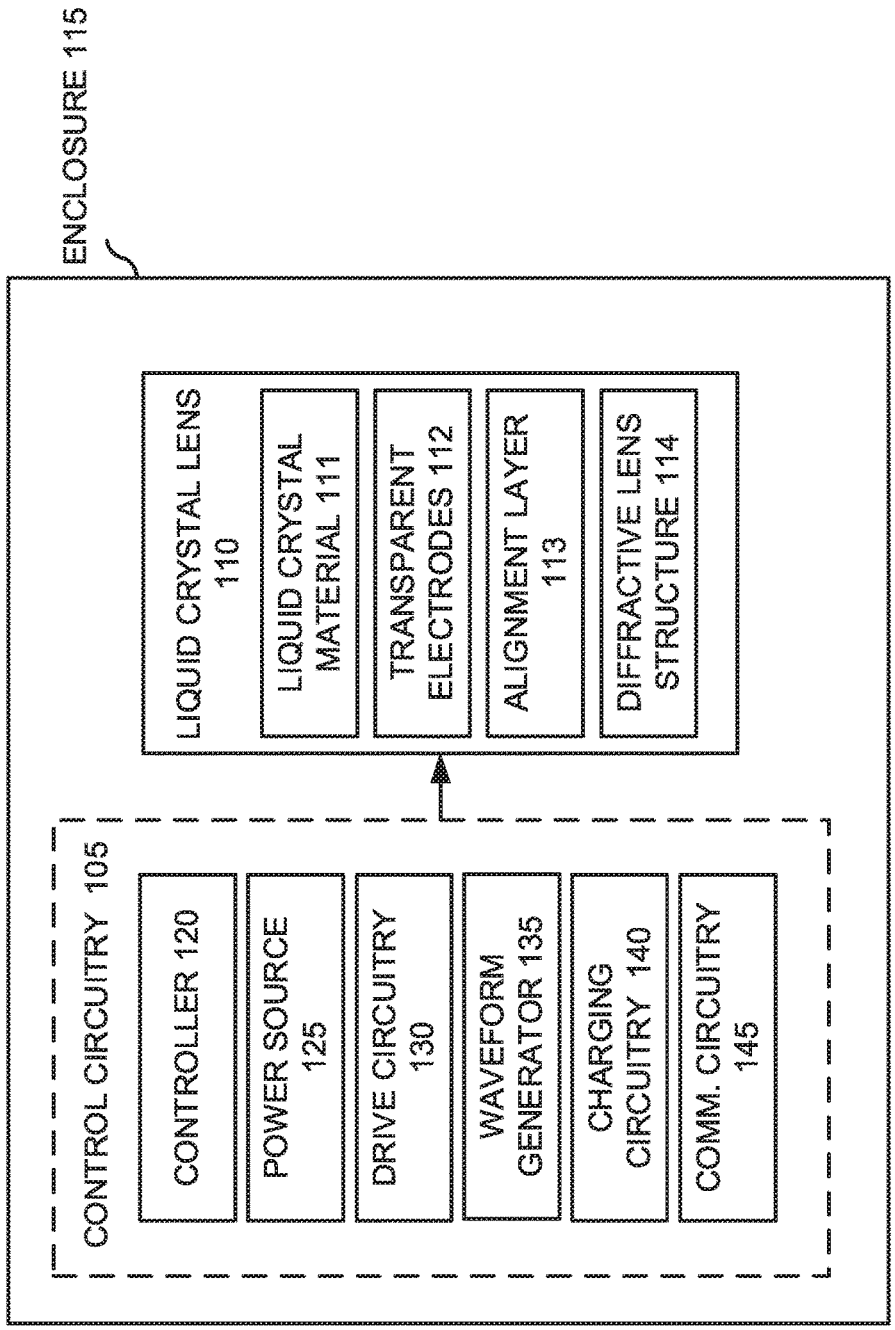
FIG. 1 is a functional block diagram of a liquid crystal device, in accordance with an embodiment of the disclosure.

Embodiments of liquid crystal devices are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Liquid crystal materials exhibit a phase of matter that has properties between conventional liquids (e.g., flows) and solid crystals (e.g., optical anisotropy). For some phases of liquid crystal materials, there is no long range positional order of the molecules, but there is long range orientation order. In other words, the molecules of the liquid crystal material may have an average orientation or point along a common direction, but not have an ordered crystal-like structure. Thin layers of the liquid crystal material may then be sandwiched between two glass or plastic substrates with transparent electrodes. The phase of the liquid crystal material may subsequently be manipulated by an electric field applied across the liquid crystal material via the transparent electrodes. The liquid crystal director, n, which corresponds to the average direction molecules of the liquid crystal material orient along, is rotated, for example, parallel or perpendicular to the electric field vector, depending on the dielectric permittivity anisotropy sign of the liquid crystal material.

Described herein are embodiments of liquid crystal devices (e.g., electro-optical devices such as liquid crystal displays, active lenses, optical switches, and the like) and methods of switching thereof. The liquid crystal devices are designed to transition between different states (e.g., a first state and a second state) dictated by the applied (or absence of) electric field vector and subsequent orientation of the liquid crystal material molecules. More specifically, the average orientation of the liquid crystal material molecules when the liquid crystal device is in one of the different states is based, at least in part, on the liquid crystal mode (e.g., vertical alignment mode, twisted nematic mode, and the like) of the liquid crystal device. In some embodiments, the first state corresponds to an off state (e.g., absence of applied electric field vector), while the second state is an on state (e.g., presence of an applied electric field vector). The specific orientation of the liquid crystal molecules when the liquid crystal device is in one of the first or second states, for example, is based on the liquid crystal mode. The liquid crystal mode may be dependent on the liquid crystal material properties and boundary conditions of the confining cell, which may be determined, at least in part, by alignment layers, positioned between the liquid crystal material and transparent electrodes, and the type of liquid crystal material. In one embodiment, the liquid crystal devices are twisted nematic mode liquid crystal devices. In other embodiments, the liquid crystal devices are characterized as being vertical alignment mode liquid crystal devices, in which the average direction of the molecules of liquid crystal material is substantially perpendicular to the alignment layer and/or transparent electrode in the absence of an applied electric field vector (e.g., $V_{RMS}$ is zero, such as when the device is in an off state). Thus, in an embodiment of a vertical alignment mode liquid crystal device, the molecules of the liquid crystal material orient to the vertical director (e.g., perpendicular to the transparent electrodes or alignment layer) while the liquid crystal material is in the first state (e.g., off state) and the molecules orient to the horizontal director (e.g., parallel to the transparent electrodes or alignment layer) while the liquid crystal material is in the second state (e.g., on state). Advantageously, vertical alignment mode may allow for the liquid crystal devices to have excellent contrast characteristics, good viewing angles, and fast response times. In some embodiments, the vertical alignment mode provides zero light phase retardation for on-axis propagation (e.g., the axis through the liquid crystal device that is perpendicular to the transparent electrode).

However, care should be taken when transitioning or switching the liquid crystal device between the first state (e.g., liquid crystal molecules oriented to the vertical director) and a second state (e.g., when the molecules of the liquid crystal material are oriented orthogonal (e.g., liquid crystal molecules oriented to the horizontal director) to the alignment layer/electrode surface). For example, during a rise transition (e.g., transitioning from the first state to the second state) the liquid crystal device may incur fluid dynamic instabilities, otherwise known as backflow, which can lead to an increase in rise time (e.g., a total duration needed for the molecules of the liquid crystal material to transition from the vertical orientation to the orthogonal orientation). During the rise transition, the liquid crystal device may also experience strong twist and/or 2D domain appearances which could result in optical bounces, increased light scattering, and long settling times. In particular, it was found that a step voltage waveform to transition the liquid crystal device may lead to the aforementioned fluid dynamic instabilities. In applications in which the liquid crystal device provides optical power, these instabilities may manifest as reduced optical performance and increased optical haze and/or defects.

To mitigate, reduce, or potentially eliminate the fluid dynamic instabilities that may occur when transitioning between the first state and the second state of the liquid crystal device, a first and second periodic waveform are applied, respectively, to first and second electrodes which sandwich the liquid crystal material to generate a drive waveform applied across the liquid crystal material. The drive waveform corresponds to the potential difference between the first waveform and the second waveform minus some inherent resistance (e.g., contact resistance). In some embodiments, the liquid crystal material exhibits a uniaxial nematic liquid crystal phase that reacts to the root mean square voltage ($V_{RMS}$) of the drive waveform. For example, if the first and second periodic waveforms are square waves that are oppositely phased (e.g., 180° phase difference between the first waveform and the second waveform) and have the same max voltage amplitude $V_0$, then the resultant $V_{RMS}$ of the pulse train waveform (e.g., the drive waveform over a period) is $V_0 D^{1/2}$, where D is the duty cycle. The duty cycle of the resultant drive waveform is changed over a first period of time via direct duty cycling or phase-shift duty cycling of the first and second waveforms to transition the liquid crystal material between the first state and the second state without, or at least with reduced, fluid dynamic instabilities.

FIG. 1 is a functional block diagram of a liquid crystal device 100, in accordance with an embodiment of the disclosure. The illustrated embodiment of the liquid crystal device 100 includes control circuitry 105, liquid crystal lens 110, and an enclosure 115. The illustrated embodiment of the control circuitry 105 includes a controller 120, a power source 125, drive circuitry 130, a waveform generator 135, charging circuitry 140, and communication circuitry 145. The illustrated embodiment of liquid crystal lens 110 includes liquid crystal material 111, one or more transparent electrodes 112, one or more alignment layers 113, and one or more diffractive lens structures 114.

Liquid crystal device 100 may be implemented in a variety of electro-optical devices such as liquid crystal displays, active lenses, optical switches, and the like. However, for the sake of brevity, the liquid crystal device 100 will be discussed in context of an ophthalmic system such as a smart contact lens or intraocular device which may be mounted over a user's eye or implanted into the anterior chamber, the posterior chamber, or other locations of the user's eye. In various embodiments, both control circuitry 105 and liquid crystal lens 110 are disposed within enclosure 115. Enclosure 115 is an optically transmissive material (e.g., transparent, clear, etc.) that hermetically seals the internal components of liquid crystal device 100 and protects the eye. The enclosure 115 may have concave and convex surfaces similar to a contact lens, have generally flat surfaces, or otherwise in various embodiments. The enclosure 115 may include one or more biocompatible materials, such as those employed for use in contact lenses or other ophthalmic applications. The enclosure 115 may optionally be formed in part from such biocompatible materials or may include an outer coating with such biocompatible materials. The enclosure 115 may include materials configured to moisturize the corneal surface, such as hydrogels and the like. In some instances, the enclosure 115 may be a deformable ("non-rigid") material to enhance wearer comfort. In some instances, enclosure 115 may be a semi-rigid material shaped to provide a predetermined, vision-correcting base optical power to a wearing of the liquid crystal device 100. The enclosure 115 may be fabricated of various materials including a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate), silicone elastomer, or combinations of these, or otherwise.

In some embodiments, the enclosure 115 includes one or more materials. For example, the enclosure 115 may include at least two polymeric materials, a soft exterior to be mounted to the corneal or scleral surface and a rigid center material. The rigid center material may contain active electronics (e.g., control circuitry 105) while the soft lens material may be flexible and/or soft for the ocular comfort of the user. The soft lens material may include silicone or silicone-based hydrogels and fully encapsulate the rigid lens material. The rigid lens material may include PMMA, rigid gas permeably polymers, rigid silicone and the like.

Controller 120 includes the logic that coordinates the operation of components of liquid crystal device 100. Controller 120 may be implemented as hardware logic (e.g., application specific integrated circuit, field programmable gate array, etc.), software/firmware logic executed on a general purpose microcontroller or microprocessor, or a combination of both hardware and software/firmware logic. Controller 120, for example, may be coupled to memory included in control circuitry 105 or otherwise to store instructions for execution by controller 120. The instructions, when executed by the controller 120 may cause the liquid crystal device 100 to perform operations that correspond to the various functional modules of the control circuitry 105. The memory is a non-transitory computer-readable medium that may include, without limitation, a volatile (e.g. RAM) or non-volatile (e.g. ROM) storage system readable by controller 120.

Power source 125 may be implemented using a variety of power storage devices including a rechargeable battery and/or capacitive elements. The drive circuitry 130 receives control signals from the controller 120 to drive the liquid crystal lens 110 with a drive waveform. The drive circuitry 130 may include counters, a high speed clock, a bank of registers, one or more H-bridges, and the like for transitioning liquid crystal material included in the liquid crystal lens 110 between the first and second states. Waveform generator 135 may include or be coupled to a clock to generate the first and/or second periodic waveforms. Charging circuitry 140 is coupled to power source 125 for charging power source 125 and may include an inductive charging element, a photovoltaic element, a microelectromechanical systems ("MEMS") charging unit that uses natural motion to generate a current, or otherwise. Communication circuitry 145 is coupled to controller 120 to provide external communications therewith. Communication circuitry 145 may include a passive backscatter antenna (e.g., RFID tag) or an active antenna if power budgets permit.

The liquid crystal device 100 includes liquid crystal lens 110 to provide variable optical power that may be dynamically adjusted during operation under the coordination and influence of control circuitry 105. The liquid crystal material 111, transparent electrodes 112, alignment layers 113, and diffractive lens structure 114 may be positioned or ordered in such a way to provide variable and configurable optical power. In one embodiment, the liquid crystal lens 110 provides a first level of optical power and a second level of optical power. Transitioning between the first and second levels of optical power may be controlled by adjusting the orientation of the liquid crystal material 111 molecules. In one embodiment, the first level of optical power is for distance vision and the second level of optical power, different from the first level of optical power, is for near vision (e.g., reading or computer monitor distances). In one embodiment, the first level of optical power is a default state that persists in the absence of an applied voltage while the second state persists when control circuitry 105 is actively applying a drive waveform to liquid crystal lens 110. This configuration provides a failsafe mode where the user's vision defaults to distance vision (e.g., for driving) should control circuitry 105 fail or run out of power.

FIG. 2A is a cross-sectional illustration of liquid crystal lens 110 coupled to control circuitry 105, in accordance with an embodiment of the disclosure. It should be noted that the liquid crystal lens 110 omits certain elements for clarity. Liquid crystal lens 110 includes liquid crystal material 111 disposed between a first and second electrode 112, which are opposite one another. Molecules of the liquid crystal material 111 assume a first orientation during a first state and a second orientation, different than the first orientation, during a second state. The state (e.g., the first or second state) expressed by the liquid crystal material 111 is predicated on the electric field applied (or lack thereof) across the liquid crystal material 111 (e.g., between the first and second electrodes 112). In some embodiments, the first state corresponds to the absence of an applied electric field and the second state corresponds to the application of an electric field having a $V_{RMS}$ greater than a switching voltage of the liquid crystal material 111.

As illustrated, the control circuitry 105 is applying a first periodic waveform LCp1 222 to the first electrode 112-A and a second periodic waveform LCp2 224 to the second electrode 112-B to generate a drive waveform 226 applied across the liquid crystal material 111. The liquid crystal material 111 reacts to $V_{RMS}$ of the drive waveform, which can be controlled either via amplitude steps or duty cycle steps, to transition the liquid crystal material between the first state and the second state.

FIGS. 2B and 2C illustrate example periodic waveforms applied to the electrodes 112 and resultant drive waveform 226 applied across the liquid crystal material 111. As illustrated in FIG. 2B, the first periodic waveform 222 and second periodic waveform 224 are square waves that oscillate between a first voltage (5V) and a reference voltage (0V). In some embodiments the first voltage may be supplied by a positive terminal of the power supply (e.g., a battery such as power source 125 included in FIG. 1), while the reference voltage corresponds to ground or 0 V, which may be supplied by a negative terminal of the same power supply. In some embodiments, the amplitude of the periodic waveforms 222/224 are chosen such that the peak-to-peak drive voltage of the drive waveform is two to three times greater than the switching voltage of the liquid crystal material. It is noted that the duty cycle of the illustrated periodic waveforms 222/224 is 50% with a relative phase offset between the two waveforms of approximately 180°. In some embodiments, one or both of the duty cycle and relative phase difference may be fixed and/or variable dependent on how the control circuitry 105 is configured to switch the liquid crystal material 111 between the first state and the second state. It is also appreciated that the representation of the periodic waveforms 222/224 as square waves should not be deemed limiting, and that other periodic waveforms, such as sine waves, triangle waves, sawtooth waves, etc., may be utilized within the context of embodiments of the disclosure.

In the illustrated embodiment of FIG. 2C, the drive waveform 226 applied across the liquid crystal material 111 is the resultant waveform of the first periodic waveform 222 being applied to the first electrode 112-A and the second periodic waveform 224 being applied to the second electrode 112-B. In other words, the drive waveform 226 is the difference between the first periodic waveform 222 and the second periodic waveform 224. As illustrated the drive waveform oscillates between a first drive voltage (e.g., 5V) and a second drive voltage (e.g., -5V). The first drive voltage corresponds to the reference voltage subtracted from the first voltage (e.g., 5V-0V) and the second drive voltage corresponds to the first voltage subtracted from the reference voltage (e.g., 0V-5V). The peak-to-peak voltage of the drive waveform (e.g., 10V) is chosen to be two to three times larger than the switching voltage of the liquid crystal material such that $V_{RMS}$ of the drive waveform is high enough to transition the liquid crystal material from the first state to the second state.

FIGS. 3A-3B illustrate techniques for controlling a duty cycle of a drive waveform, in accordance with an embodiment of the disclosure. FIG. 3A illustrates direct duty cycling and FIG. 3B illustrates phase-shift duty cycling, which are two possible implementations for duty cycling the drive waveform when applying the first periodic waveform 222 and the second periodic waveform 224 to the liquid crystal lens 110. Duty cycling the drive waveform allows for a controllable percentage of the peak-to-peak voltage of the drive waveform to be applied across the liquid crystal material 111, which can be used to change the duty cycle of the drive waveform over a first time period to transition the liquid crystal material 111 between the first state and the second state.

As illustrated in FIG. 3A, direct duty cycling is first achieved by generating the first periodic waveform 222 and second periodic waveform 224 (e.g., via waveform generator 135 of FIG. 1). The periodic waveforms 222/224 have a common duty cycle (e.g., 50%) and are oppositely phased (e.g., 180° relative phase difference). The second periodic waveform 224 (or vice versa) may be generated by delaying and/or inverting the first periodic waveform 222 with controller circuitry (e.g., control circuitry 105 in FIG. 1). The common duty cycle may be incrementally adjusted from a first percentage (e.g., 0%) to a second percentage (e.g., 50%) over a first time period (e.g., 100-200 milliseconds) to change the duty cycle of the drive waveform. Direct duty cycle changing may be gradual such that there are several transition points between the first and second percentages. In some embodiments, the direct duty cycle is ramped linearly from the first percentage to the second percentage (e.g., there is an approximately constant step size between the transition points when transitioning between the first and second percentages). In other embodiments, the direct duty cycle is changed nonlinearly, such as exponentially or logarithmically. In other words, there may be an irregular (e.g., not constant) step size between the transition points when transitioning between the first and second percentages. In the same or other embodiments, the resultant drive waveform 326 may spend one or more cycles at each transition point (including the first and second percentages) when transitioning between the first and second states of the liquid crystal material 111.

In the illustrated embodiment of FIG. 3B, phase-shift duty cycling is first achieved by generating the first periodic waveform 222 and second periodic waveform 224 (e.g., via waveform generator 135 of FIG. 1). In some embodiments, one of the waveforms may be fixed (e.g., the first periodic waveform 222 may be fixed as a 50% duty cycle square waveform). The second periodic waveform 224 may also be a 50% duty cycle square waveform, but have a relative phase difference (e.g., from the first periodic waveform 222) generated by simple digital delays and counters. When the relative phase difference between the periodic waveforms 222/224 is 0°, the $V_{RMS}$ applied across the liquid crystal material 111 is 0, and the liquid crystal lens is not actuated. When the relative phase difference is at or near 180°, a peak-to-peak $V_{RMS}$ is applied to the liquid crystal material 111 for transitioning the liquid crystal material between states (e.g., from the first state to the second state).

In some embodiments, the control circuitry (e.g., control circuitry 105 and/or drive circuitry 130) includes digital logic to determine an amount of relative phase shift between the first periodic waveform 222 and the second periodic waveform 224 by utilizing a counter 354, a higher speed clock 350 (e.g., a clock having a frequency 10× faster than the frequency of the first periodic waveform 222), and one or more registers 356 that are gated by the counter to lock in the desired phase shift through the delay determined by the counter 354 and countval 352. The digital logic may reset and start each counter 354 on each edge (e.g., rising edge of each period for the first periodic waveform 222). Subsequently, a positive edge pulse may be output when the value of the countval 352 is reached to indicate a transition to the subsequent duty cycle percentage. Additional counters 354 may further be incorporated to provide better control over the duty cycle changing of the drive waveform 328. In some embodiments, a counter to count the number of periodic cycles of the first and second periodic waveforms 222/224 that appear per drive waveform duty cycle step is included. A duty cycle incrementer may also be included in the digital logic/control circuitry that increments the duty cycle to the next duty cycle setting once a pre-determined number of counts are achieved at an immediately prior duty cycle setting. Finally, this process may be repeated until the desired $V_{RMS}$ applied across the liquid crystal material 111 is reached for controlling switching of the liquid crystal material between states. In the same or other embodiments, there may be simultaneous phase shifting of the first periodic waveform 222 and the second periodic waveform 224, rather than the discussed fixed waveform complemented by a shifted waveform.

As illustrated in FIG. 3B, the resultant shifted second periodic waveform 324 based on delays and counters of the first periodic waveform 222 is utilized in conjunction with the first periodic waveform 222 to generate the drive waveform 328 to be applied across the liquid crystal material. As demonstrated in FIG. 3A, the drive waveform of FIG. 3B is also based on the difference between the two periodic waveforms.

Figure 4:
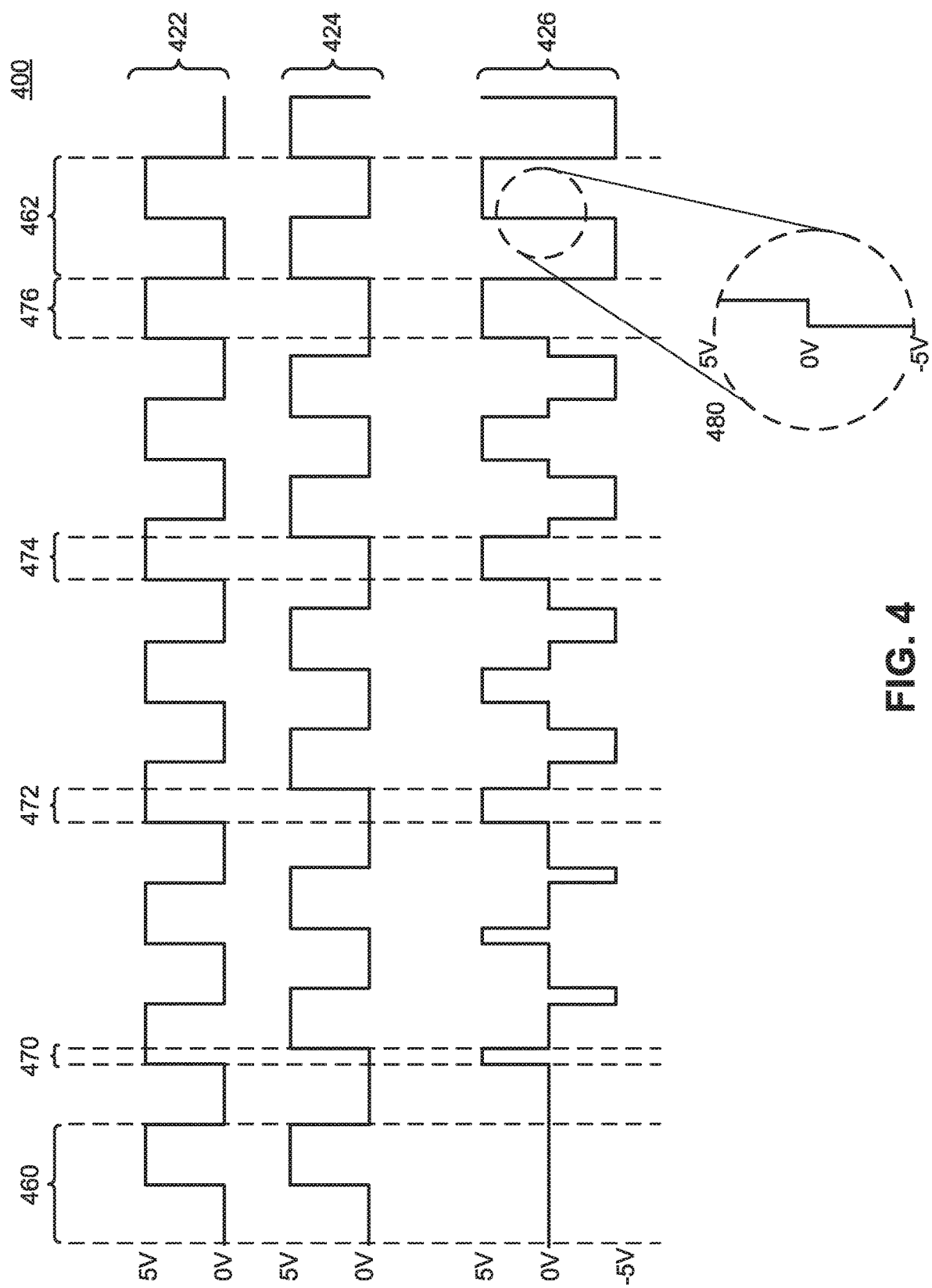
FIG. 4 illustrates an example timing diagram for switching a liquid crystal material from a first state to a second state, in accordance with an embodiment of the disclosure.

FIG. 4 illustrates an example timing diagram 400 for switching a liquid crystal material from a first state to a second state, in accordance with an embodiment of the disclosure. The timing diagram 400 is an exemplary timing diagram that includes a first periodic waveform 422, a second periodic waveform 424, and a resultant drive waveform 426 for transitioning liquid crystal material (e.g., of liquid crystal lens 111 of FIG. 1) between a first state and a second state. The first periodic waveform 422 and the second periodic waveform 424 are both square waves having a common duty cycle of 50% and a fixed amplitude of 5 V. The periodic waveforms 422/424 are initially in phase (e.g., 0° relative phase difference) as shown cycle 460, which corresponds to when the liquid crystal material is in the first state. At the end of the timing diagram 400, the periodic waveforms 422/424 are nearly 180° out of phase (e.g., oppositely phased) as shown in cycle 462, which corresponds to when the liquid crystal material is in the second state.

In the illustrated embodiment, the transition from the first state to the second state occurs over several cycles with different relative phase differences (e.g., different delays) that gradually increase to achieve the desired relative phase difference and peak-to-peak $V_{RMS}$ of the drive waveform 426. For example, each delay (470, 472, 474, and 476) is applied to at least two cycles of the second periodic waveform 424 to incrementally adjust a relative phase difference between the first periodic waveform 422 and the second periodic waveform 424 from a first value (e.g., 0°) to a second value (e.g., greater than 170°, but less than 180°). The change in relative phase difference for each of the delays 470, 472, 474, and 476 correspond to changing the duty cycle of the drive waveform 426 to 12.5%, 25%, 37.5%, and 49.5%, respectively.

As illustrated, the duty cycle of the drive waveform 426 is ramped linearly from 0% to 49.5%. The drive waveform 426 with a duty cycle of 0% corresponds to a 0° relative phase difference between the first and second periodic waveforms 422/424, which results in the liquid crystal material being in the first state (e.g., off state with an absence of an applied electric field vector). The drive waveform with a duty cycle of 49.5% corresponds to approximately a 178° relative phase difference between the first and second periodic waveforms 422/424, which results in the liquid crystal material being in the second state (e.g., on state with an applied electric field vector). In the illustrated embodiment, the duty cycle of drive waveform 426 is changed from 0% to 49.5% with a constant step size of approximately 12.5% between the transition points (e.g., 12.5%, 25%, 37.5%, etc.). However, it is appreciated that in other embodiments, the duty cycle of the drive waveform 426 may be changed nonlinearly, such as exponentially or logarithmically, when transitioning the liquid crystal material between the first state and the second state. In other words, there may be an irregular (e.g., not constant) step size when changing the duty cycle of the drive waveform 426. It is further appreciated that the drive waveform 426 may spend one or more cycles at each transition point (e.g., at a duty cycle of 12.5%, 25%, or other percentages) when transitioning between the liquid crystal material between the first and second states.

In the illustrated embodiment, generating the drive waveform 426 with two periodic waveforms 422/424 results in a staircase waveform that provides significant power consumption benefits. As illustrated in each cycle of the drive waveform 426, including the rising edge 480, the first periodic waveform 422 and second periodic waveform 424 are modulated such that the drive waveform 426 spends a non-zero amount of time at the reference voltage (e.g., 0V) when oscillating between the first drive voltage (e.g., 5V) and the second drive voltage (e.g., −5V) to reduce power consumption of the liquid crystal material. Rather than immediately transitioning from −5V to 5V, the liquid crystal material is driven to zero voltage differential for a long enough time period to short out the charge that is pre-existing on the liquid crystal (e.g., by coupling to the negative input terminal of a battery or ground). If the zero voltage drive time is too low or non-existent, the inverted charge may not be fully shorted out, and additional charge to invert and re-energize the liquid crystal material in the opposite polarity will come from the supply voltage (e.g., positive terminal of a battery). Thus, in some embodiments, the drive waveform may not be driven to a duty cycle of exactly 50% (e.g., the relative phase difference between periodic waveforms 422/424 is 180°), but rather driven to a duty cycle slightly less than 50% (e.g., the relative phase difference between periodic waveforms 422/424 is somewhere between 170° and 180°, which corresponds to a duty cycle between 47% and 50%) to still achieve close to maximum drive amplitude, but also allow for significant power savings by leveraging non-zero drive time at zero voltage differential to reset the liquid crystal material between opposite charge energization.

Figure 5A:
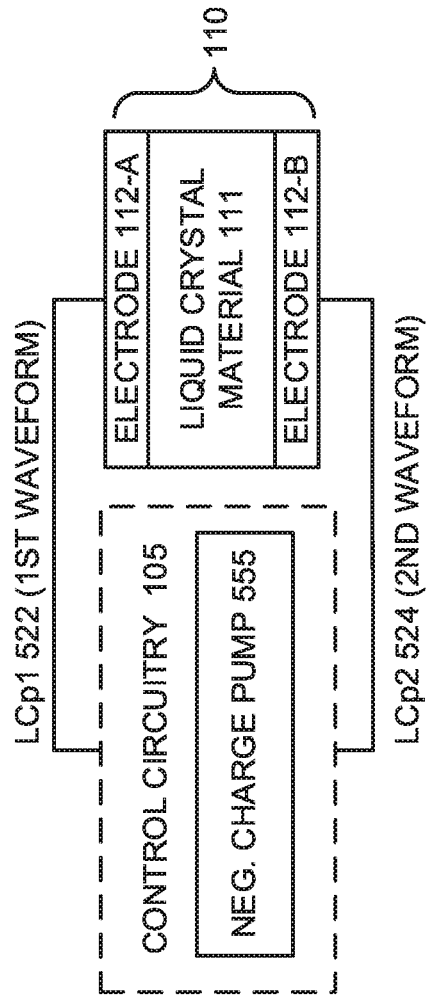
FIGS. 5A-5C illustrate example periodic waveforms for driving a liquid crystal lens, in accordance with an embodiment of the disclosure.
Figure 5B:
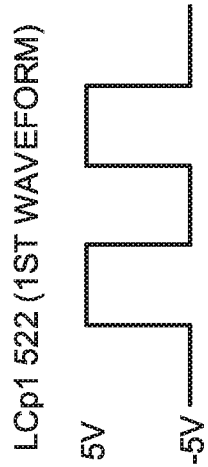
Figure 5C:

FIGS. 5A-5C illustrate example periodic waveform 522 for driving a liquid crystal lens 110, in accordance with an embodiment of the disclosure. As illustrated in FIG. 5A, a first periodic waveform 522 and a reference waveform 524 is applied to a first electrode 112-A and a second electrode 112-B, respectively to generate a drive waveform 526. The control circuitry 105 includes a switched capacitor negative charge pump 555 to generate negative voltages. At the cost of required additional area for the negative charge pump 555, a first periodic waveform 522 oscillates between −5V and 5V, which meets a desired peak-to-peak voltage amplitude of 10V. The second electrode 112-B may then be coupled to ground (e.g., 0V) as a reference waveform so that a drive waveform 526 based on the first periodic waveform 522 and the reference waveform 524 is applied across the liquid crystal material 111 to transition the liquid crystal material 111 between a first state and a second state.

Figure 6A:
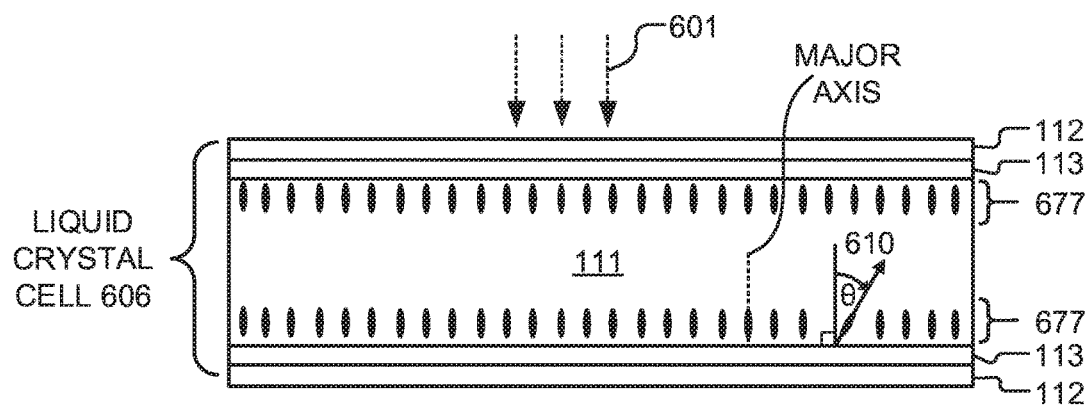
FIG. 6A is a cross-sectional illustration of a liquid crystal cell, which is included in the liquid crystal lens of FIG. 1, in accordance with an embodiment of the disclosure.

FIG. 6A is a cross-sectional illustration of a liquid crystal cell 606, which is included in the liquid crystal lens of FIG. 1, in accordance with an embodiment of the disclosure. As illustrated, the liquid crystal material 111 is disposed between transparent electrodes 112. The liquid crystal cell 606 also includes alignment layers 113 disposed between the liquid crystal material 111 and the transparent electrodes 112. In some embodiments, the alignment layer 113 is disposed on a surface of the transparent electrodes 112 proximate to the liquid crystal material 111. The alignment layer 113 defines the boundary conditions for the liquid crystal material 111. In other words, the alignment layer 113 defines the preferred direction for the molecules of the liquid crystal material 111 on its surface in the absence of an applied electric field. In the illustrated embodiment, the liquid crystal material is in the first state corresponding to vertical alignment of the liquid crystal molecules with respect to the major axis upon which light 601 propagates through. The major axis is normal to the electrodes 112. A portion of the liquid crystal molecules 677 proximate to the alignment layer 113 deviate less than five degrees from an angle normal to the surface of the electrodes 112 when the liquid crystal material 111 is in the first state. This deviation from the surface normal is known as pre-tilt, illustrated by molecule 610, which for clarity shows a pre-tilt of approximately 30°.

Figure 6B:
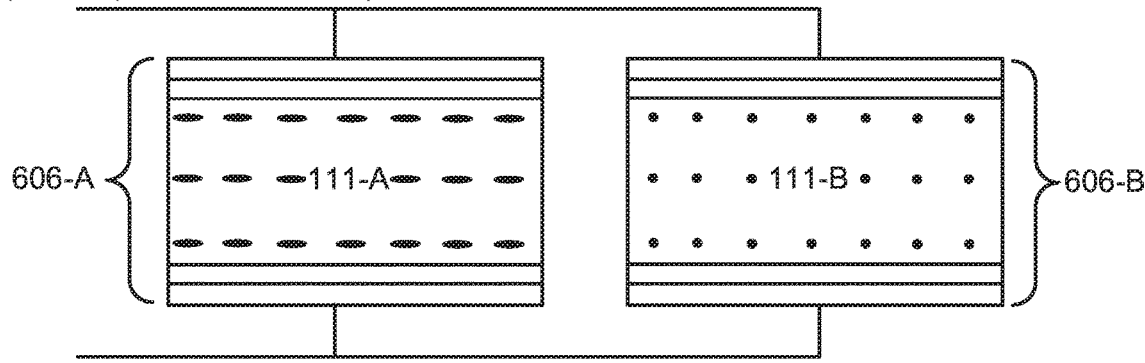
FIG. 6B illustrates a plurality of liquid crystal cells coupled in parallel with the liquid crystal material in the second state, in accordance with an embodiment of the disclosure.

FIG. 6B illustrates a plurality of liquid crystal cells 606 coupled in parallel with the liquid crystal material in the second state, in accordance with an embodiment of the disclosure. The liquid crystal cells 606-A and 606-B are coupled to control circuitry 105 and driven simultaneously with first periodic waveform 222 and second periodic waveform 224 applied to opposing electrodes 112. The liquid crystal material 111 is in the second state as the first periodic waveform 222 and second periodic waveform 224 are oppositely phased waveforms as described previously. When in the second state the liquid crystal materials 111-A and 111-B are oriented orthogonal to the first state (vertical alignment). More specifically, molecules of the liquid crystal material 111-A and liquid crystal material 111-B are also orthogonal to each other, such that if the two liquid crystal cells 606-A and 606-B are stacked on top of each other, light propagating through the liquid crystal device is collectively polarization insensitive along the normal trajectory 601.

Figure 6C:
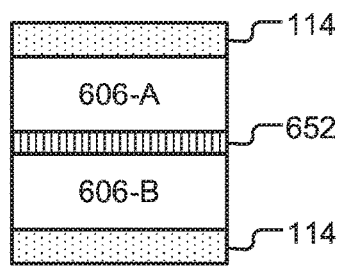
FIG. 6C illustrate two configurations for a liquid crystal lens, in accordance with an embodiment of the disclosure.
Figure 6C:
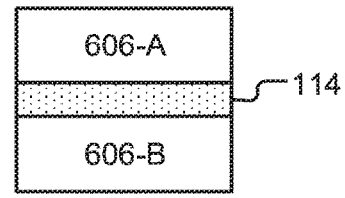

FIG. 6C illustrate two configurations for a liquid crystal lens, in accordance with an embodiment of the disclosure. Configuration A 692 illustrates a first stacked structure in which the two liquid crystal cells 606-A and 606-B are stacked along the normal trajectory 601. Disposed between the two liquid crystal cells 606-A and 606-B is a transparent center substrate 652. Diffractive lens structures 114 adapted to provide optical power when the liquid crystal material is in at least one of the first state or the second state. In one embodiment, the diffractive lens structures 114 have a refractive index matched to the refractive index of the liquid crystal material 606 when in the first state. When indexed matched, light propagating through the liquid crystal device with configuration A 692 may not have optical power provided by the diffractive lens structures 114. In other embodiments, when index matched, a base line optical power may be provided to light propagating through the liquid crystal device by the diffractive lens structure 114. Conversely, when the liquid crystal is in the second state, the diffractive lens structures 114 may not be index matched (e.g., difference between refractive indexes is greater than 0), which results in the liquid crystal device providing optical power (in addition to the base line optical power) to light propagating through the liquid crystal device via, at least in part, the diffractive lens structures 114. Configuration B 694 is similar to configuration A in many regards for operation. However, structurally, rather than utilizing center substrate 652, a single diffractive lens structure 114 is disposed between the liquid crystal cells 606-A and 606-B.

Figure 7A:
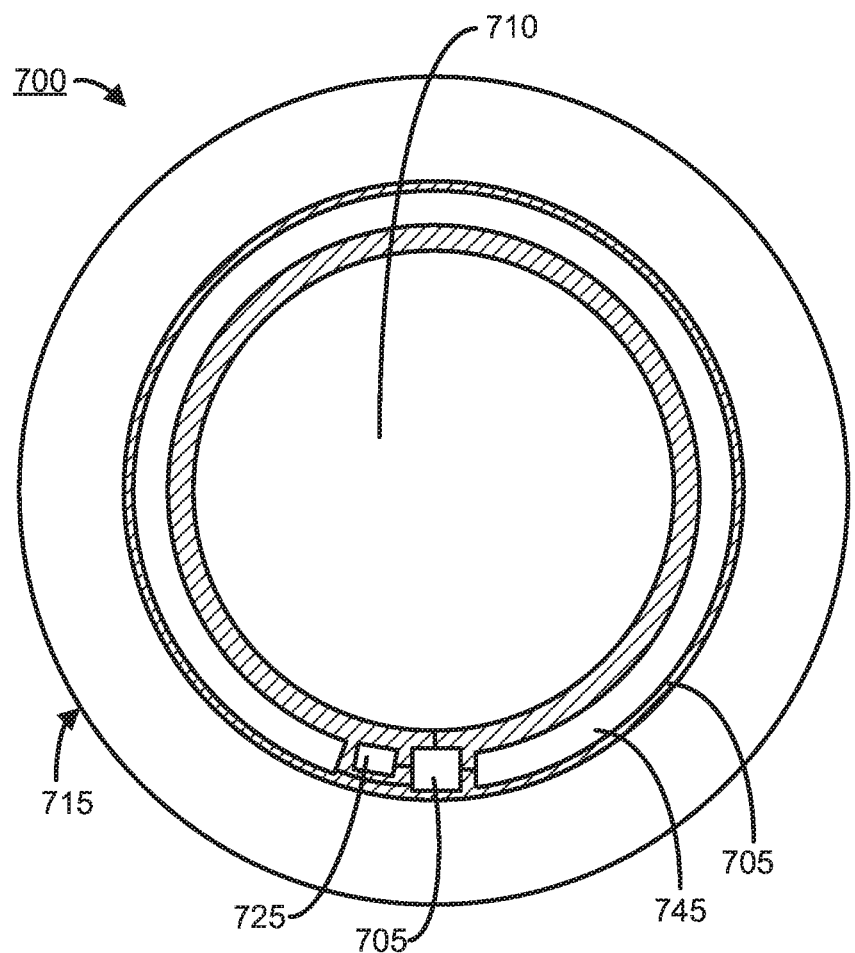
FIGS. 7A-7B are illustrations of a contact lens system including a liquid crystal lens, in accordance with an embodiment of the disclosure.
Figure 7B:
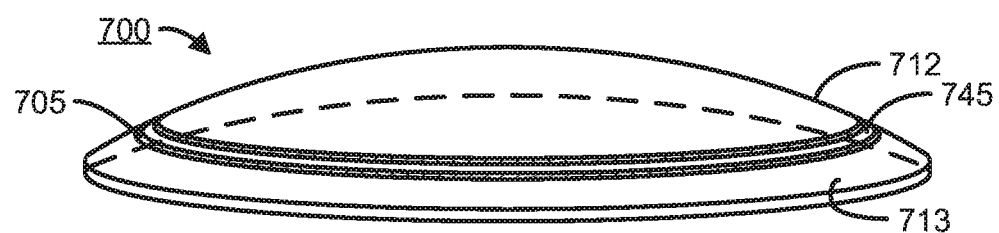

FIGS. 7A-7B are illustrations of a contact lens system 700 including a liquid crystal lens 710, in accordance with an embodiment of the disclosure. Contact lens system 700 is one possible implementation of liquid crystal device 100 illustrated in FIG. 1. The illustrated embodiment of contact lens system 700 includes a substrate 705, a liquid crystal lens 710, an enclosure 715, control circuitry 705, a power source 725, and an antenna 740. Enclosure 715 has a size and shape that mounts over the cornea of an eye. In the illustrated embodiment, enclosure 715 includes an external side 712 having a convex shape and an eye-ward side 713 having a concave shape. Of course, contact lens system 700 may assume other shapes and geometries including a piggyback configuration that attaches to a surface of an eye-mountable carrier substrate having an overall shape that resembles a conventional contact lens.

In the illustrated embodiment, control circuitry 720, power source 725, and antenna 745 are all disposed on ring-shaped substrate 705, which encircles liquid crystal lens 710. The components are all disposed within enclosure 715. In one embodiment, antenna 745 is coupled to control circuitry 720 to operate as both a passive backscatter antenna for off-device communications and as an inductive charging antenna for charging power source 725.

Figure 8A:
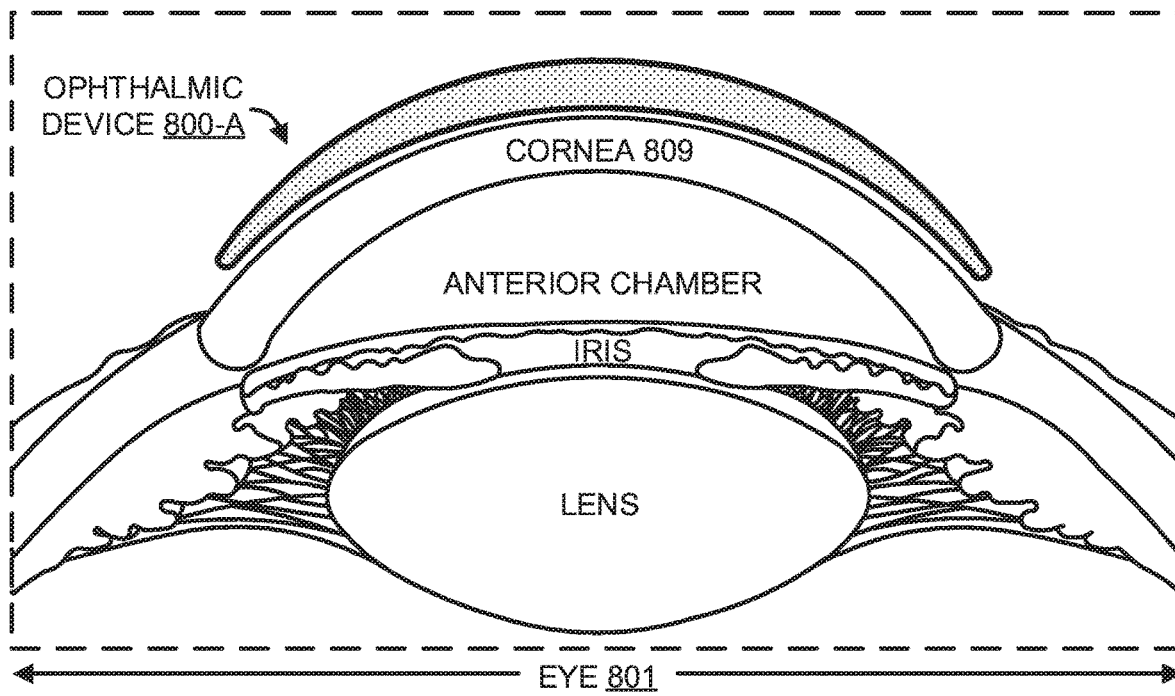
FIGS. 8A-8B are cross-sectional illustrations of an ophthalmic system including a liquid crystal lens mountable on or in an eye of a user, in accordance with an embodiment of the disclosure.
Figure 8B:
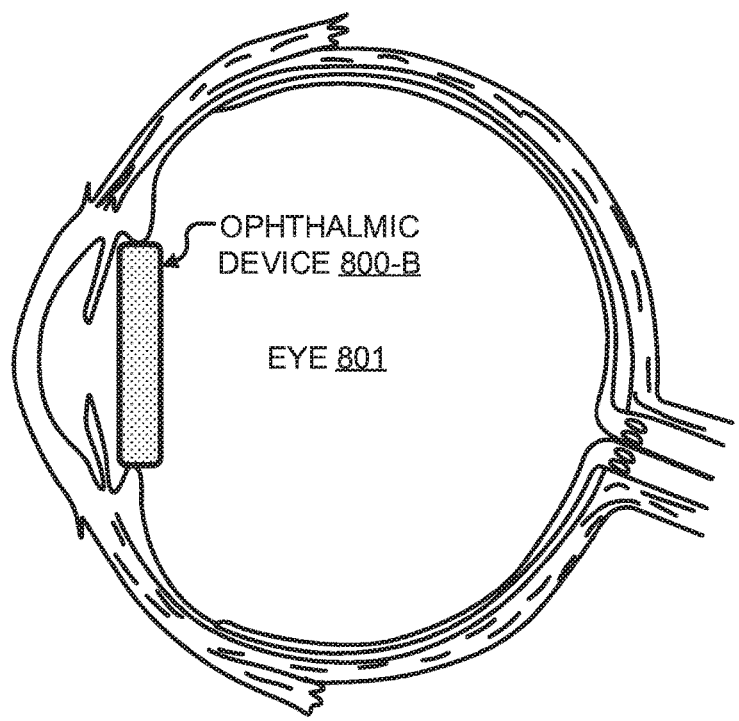

FIGS. 8A-8B are cross-sectional illustrations of an ophthalmic system 800-A and 800-B including a liquid crystal lens mountable on or in an eye of a user, in accordance with an embodiment of the disclosure. Ophthalmic systems 800-A and 800-B are possible implementations of the liquid crystal device 100 of FIG. 1. As illustrated, ophthalmic system 800-A is mounted on a cornea 809 of an eye 801 of a user and has a similar shape to a contact lens. Ophthalmic system 800-B is mounted in an eye 801 of the user.

Figure 9:
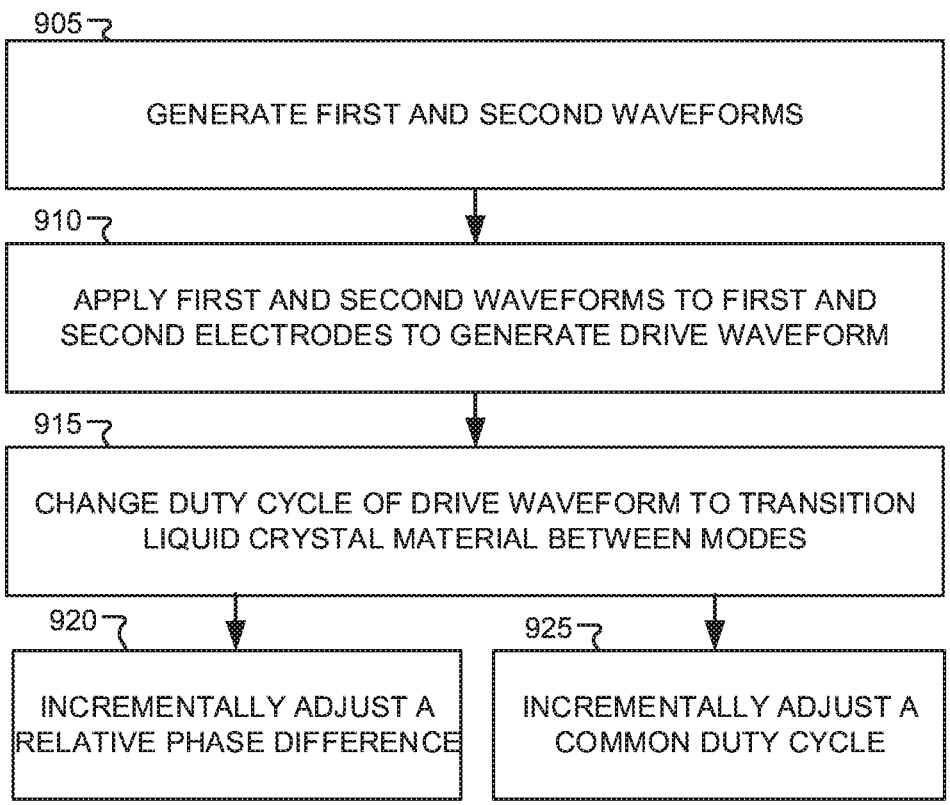
FIG. 9 is an example method of switching a liquid crystal material between a first state and a second state, in accordance with an embodiment of the disclosure.

FIG. 9 is an example method 900 of switching a liquid crystal material between a first state and a second state, in accordance with an embodiment of the disclosure. It is appreciated that method 900 may be implemented via a machine accessible.

Block illustrates 905 illustrates generating a first and a second waveform. As discussed previously, the first and second waveforms may be generated by a waveform generator included in control circuitry of a liquid crystal device. The first and second waveforms may be periodic waveforms having a common duty cycle percentage (e.g., 50%) and amplitude (e.g., 5V). In some embodiments, the first and second waveforms are square waves. In one embodiment, the first and second waveforms oscillate between a first voltage (e.g., 5V) and a reference voltage (e.g., ground or 0V).

Block 910 shows applying the first and second waveforms to first and second electrodes, respectively, to generate a drive waveform applied across a liquid crystal material disposed between the first and second electrodes. In some embodiments, the drive waveform oscillates between a first drive voltage and a second drive voltage. The first drive voltage may correspond to the reference voltage subtracted from the first voltage (e.g., 5V) and the second drive voltage may correspond to the first voltage subtracted from the reference voltage (e.g., −5V).

Block 915 illustrates changing a duty cycle of the drive waveform to transition the liquid crystal between a first state and a second state. In some embodiments, when the liquid crystal material is in the first state, liquid crystal molecules may have an orientation perpendicular with a surface of the first and/or second electrode (e.g., vertical alignment). When the liquid crystal material is in the second state, the liquid crystal molecules may have an orientation parallel with the surface of the first and/or second electrode (e.g., horizontal alignment).

Block 920 shows incrementally adjusting a relative phase difference between the first and second waveforms to change the duty cycle of the drive waveform. In some embodiments, the relative phase difference between the first and second waveforms is 0° degrees when the liquid crystal material is in the first state such that the first and second waveforms are in phase (e.g., the amplitude of the drive waveform is 0V). In the same or other embodiments, the relative phase difference between the first and second waveforms is nearly 180° (e.g., 179.5°) when the liquid crystal material is in the second state such that the first and second waveforms are substantially oppositely phased waveforms. The relative phase difference may be adjusted incrementally from 0° to 180° so that a pre-determined amount of cycles of the drive waveform is spent at various duty cycle percentages. In one embodiment, the drive waveform may spend a pre-determined number of cycles/periods (e.g., 3) at incrementally increasing duty cycle percentages (e.g., 12.5%, 25%, 37.5%, 49.5%) to transition the liquid crystal material from the first state to the second state over a first time period (e.g., 100-200 milliseconds). It is appreciated that the incremental adjustment of the relative phase difference may be repeated for transitioning the liquid crystal material between the first and second states as desired.

Block 925 illustrates incrementally adjusting a common duty cycle of the first and second waveforms to change the duty cycle of the drive waveform. In one embodiment, the common duty cycle may be adjusted from 0% to 50% over a first time period. The common duty cycle of the first and second waveforms may be adjusted incrementally from 0% to 50% so that a pre-determined amount of cycles of the drive waveform is spent at various duty cycle percentages. In one embodiment, the drive waveform may spend a pre-determined number of cycles/periods (e.g., 3) at incrementally increasing duty cycle percentages (e.g., 12.5%, 25%, 37.5%, 49.5%) to transition the liquid crystal material from the first state to the second state over a first time period (e.g., 100-200 milliseconds). It is appreciated that the incremental adjustment of the relative phase difference may be repeated for transitioning the liquid crystal material between the first and second states as desired.

The processes explained above are described in terms of computer software and hardware. The techniques described may constitute machine-executable instructions embodied within a tangible or non-transitory machine (e.g., computer) readable storage medium, that when executed by a machine (e.g., controller 120) will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
a liquid crystal material disposed between a first electrode and a second electrode opposite the first electrode, wherein molecules of the liquid crystal material assume a first orientation during a first state of the liquid crystal material and a second orientation during a second state of the liquid crystal material, and wherein the first orientation is different than the second orientation; and
a controller coupled to the first electrode and the second electrode, wherein the controller stores instructions that when executed by the controller causes the apparatus to perform operations including:
applying a first periodic waveform to the first electrode and a second periodic waveform to the second electrode to generate a drive waveform applied across the liquid crystal material; and
incrementally adjusting a relative phase difference between the first periodic waveform and the second periodic waveform from a first value to a second value to change a duty cycle of the drive waveform over a first time period and transition the liquid crystal material between the first state and the second state, wherein during each of the incremental adjustments of the relative phase difference, the liquid crystal material is driven to a zero voltage differential for a non-zero amount of time to short out pre-existing charge on the liquid crystal material, wherein the liquid crystal material exhibits the first state when the first periodic waveform applied to the first electrode is in phase with the second periodic waveform applied to the second electrode, and wherein the liquid crystal material exhibits the second state when the first waveform is substantially oppositely phased with the second waveform.

2. The apparatus of claim 1, further comprising:
a waveform generator coupled to the first electrode, the second electrode, and the controller, wherein the controller stores additional instructions that when executed by the controller causes the apparatus to perform further operations including:
generating the first periodic waveform and the second periodic waveform, at least in part, with the waveform generator, wherein the first periodic waveform and the second periodic waveform oscillate between a first voltage and a reference voltage, wherein the drive waveform oscillates between a first drive voltage and a second drive voltage, wherein the first drive voltage corresponds to the reference voltage subtracted from the first voltage, wherein the second drive voltage corresponds to the first voltage subtracted from the reference voltage, and wherein the reference voltage corresponds to a negative input terminal of a battery or ground.

3. The apparatus of claim 2, wherein the controller stores additional instructions that when executed by the controller causes the apparatus to perform further operations including:
modulating at least one of the first periodic waveform or the second periodic waveform to temporarily drive the liquid crystal material to the zero voltage differential when oscillating between the first drive voltage and the second drive voltage to reduce power consumption of the apparatus.

4. The apparatus of claim 1, wherein the first value is 0° such that the first periodic waveform is in phase with the second periodic waveform when the relative phase difference is at the first value, and wherein the second value is greater than 170° but less than 180° such that the first periodic waveform is substantially oppositely phased with the second waveform and the duty cycle of the drive waveform is not exactly a 50% duty cycle percentage when the relative phase difference is at the second value, and
wherein the liquid crystal material exhibits the second state when the relative phase difference is the second value.

5. The apparatus of claim 1, wherein the first periodic waveform and the second periodic waveform have a common duty cycle of a first percentage.

6. The apparatus of claim 1, wherein the first time period is greater than 50 milliseconds.

7. The apparatus of claim 1, further comprising:
an alignment layer disposed on a surface of at least one of the first electrode or the second electrode proximate to the liquid crystal material; and
wherein a portion of the molecules proximate to the alignment layer deviate less than 5 degrees from an angle normal to the surface when the liquid crystal is in the first state.

8. The apparatus of claim 1, further comprising:
a plurality of liquid crystal cells coupled to the controller in parallel, each of the plurality of liquid crystal cells including a corresponding one of the liquid crystal material, the first electrode, and the second electrode.

9. The apparatus of claim 8, further comprising:
a first diffractive lens structure coupled to a first liquid crystal cell included in the plurality of liquid crystal cells;
a second diffractive lens structure coupled to a second liquid crystal cell included in the plurality of liquid crystal cells; and
a center substrate disposed between the first liquid crystal cell and the second liquid crystal cell, wherein the first liquid crystal cell is positioned between the first diffractive lens structure and the center substrate, and wherein the second liquid crystal cell is positioned between the second diffractive lens structure and the center substrate.

10. The apparatus of claim 9, wherein the controller stores additional instructions that when executed by the controller causes the apparatus to perform further operations including:

simultaneously transitioning the liquid crystal material of the first liquid crystal cell and the second liquid crystal cell between the first state and the second state to change an optical power provided by the apparatus, wherein the optical power is induced, at least in part, by the first diffractive lens structure and the second diffractive lens structure when the liquid crystal material is in at least one of the first state or the second state.

11. The apparatus of claim 8, further comprising:

a diffractive lens structure disposed between a first liquid crystal cell and a second liquid crystal cell included in the plurality of liquid crystal cells, and wherein the controller stores additional instructions that when executed causes the controller to perform further operations including:

simultaneously transitioning the liquid crystal material of the first liquid crystal cell and the second liquid crystal cell between the first state and the second state to change an optical power provided by the apparatus, wherein the optical power is induced, at least in part, by the diffractive lens structure when the liquid crystal material is in at least one of the first state or the second state.

12. The apparatus of claim 1, wherein the liquid crystal material exhibits the second state when a relative phase difference between the first periodic waveform and the second periodic waveform is greater than 170 degrees.

13. The apparatus of claim 1, wherein the drive waveform spends a pre-determined number of periods at each duty cycle percentage associated with each of the incremental adjustments of the relative phase difference when the relative phase difference is incrementally adjusted from the first value to the second value.

14. The apparatus of claim 1, wherein the incremental adjustments to the relative phase difference linearly ramp the duty cycle of the drive waveform.

15. The apparatus of claim 1, wherein the incremental adjustments to the relative phase difference nonlinearly ramp the duty cycle of the drive waveform.

16. The apparatus of claim 1, wherein the first waveform is substantially oppositely phased with the second waveform such that an average direction the molecules of the liquid crystal material orient along is parallel or perpendicular to an electric field vector between the first electrode and the second electrode when the relative phase difference between the first waveform and the second waveform is at the second value.

17. At least one machine-accessible storage medium having stored thereon instructions, which when executed by a machine cause the machine to perform operations comprising:

applying a first periodic waveform to a first electrode and a second periodic waveform to a second electrode to generate a drive waveform applied across a liquid crystal material, wherein the liquid crystal material is disposed between the first and second electrodes; and incrementally adjusting a relative phase difference between the first periodic waveform and the second periodic waveform from a first value to a second value to change a duty cycle of the drive waveform over a first time period and transition the liquid crystal material between a first state and a second state, wherein during each of the incremental adjustments of the relative phase difference, the liquid crystal material is driven to a zero voltage differential for a non-zero amount of time to short out pre-existing charge on the liquid crystal material, wherein molecules of the liquid crystal material assume a first orientation during the first state and a second orientation during the second state, and wherein the first orientation is different than the second orientation, wherein the liquid crystal material exhibits the first state when the first periodic waveform applied to the first electrode is in phase with the second periodic waveform applied to the second electrode, and wherein the liquid crystal material exhibits the second state when the first waveform is substantially oppositely phased with the second waveform.

18. The at least one machine-accessible storage medium of claim 17, wherein the first periodic waveform and the second periodic waveform oscillate between a first voltage and a reference voltage, wherein the drive waveform oscillates between a first drive voltage and a second drive voltage, wherein the first drive voltage corresponds to the reference voltage subtracted from the first voltage, and wherein the second drive voltage corresponds to the first voltage subtracted from the reference voltage.

19. The at least one machine-accessible storage medium of claim 18, having stored thereon further instructions, which when executed by the machine, cause the machine to perform additional operations comprising:

modulating at least one of the first periodic waveform or the second periodic waveform to temporarily drive the liquid crystal material to the zero voltage differential when oscillating between the first drive voltage and the second drive voltage to reduce power consumption of the machine.

20. The at least one machine-accessible storage medium of claim 17, wherein the first value is 0° such that the first periodic waveform is in phase with the second periodic waveform when the relative phase difference is at the first value, and wherein the second value is greater than 170° but less than 180° such that the first periodic waveform is substantially oppositely phased with the second waveform and the duty cycle of the drive waveform is not exactly 50% duty cycle when the relative phase difference is at the second value, and wherein the liquid crystal material is in the second state when the relative phase difference is the second value.

21. The at least one machine-accessible storage medium of claim 17, wherein the first periodic waveform and the second periodic waveform have a common duty cycle of a first percentage.

* * * * *